United States Patent
Jarred et al.

(10) Patent No.: US 7,654,774 B1
(45) Date of Patent: Feb. 2, 2010

(54) PIPE PULLING METHOD AND DEVICE

(76) Inventors: Warren S. Jarred, 8711 N. Wayland Ave., Kansas City, MO (US) 64153; Tiffany Jarred, 8711 N. Wayland Ave., Kansas City, MO (US) 64153

(*) Notice: Subject to any disclaimer, the term of this patent is extended or adjusted under 35 U.S.C. 154(b) by 0 days.

(21) Appl. No.: 12/315,677

(22) Filed: Dec. 8, 2008

(51) Int. Cl.
*F16L 1/00* (2006.01)
(52) U.S. Cl. .................................................. 405/184
(58) Field of Classification Search ............ 405/174, 405/180, 183, 184, 184.1, 184.2, 184.3, 178, 405/184.4, 184.5
See application file for complete search history.

(56) References Cited

U.S. PATENT DOCUMENTS

| | | |
|---|---|---|
| 1,205,852 A | 11/1916 | Buehler |
| 1,401,046 A | 12/1921 | Clymer |
| 2,915,333 A | 12/1959 | Koenig, et al. |
| 3,868,191 A | 2/1975 | King, Sr. |
| 4,836,595 A | 6/1989 | DiCarlo |
| 5,094,496 A | 3/1992 | King, Sr. |
| 5,524,946 A | 6/1996 | Thompson |
| 5,647,627 A | 7/1997 | Baessler |
| 5,651,639 A * | 7/1997 | Wentworth et al. .......... 405/184 |
| D393,579 S | 4/1998 | Bryant |
| 5,791,704 A | 8/1998 | Thompson et al. |

* cited by examiner

*Primary Examiner*—Sunil Singh
(74) *Attorney, Agent, or Firm*—Richard L. Mikesell

(57) ABSTRACT

A method for pulling pipe using a device that is rectangular in shape and is connected at one end thereof to a pulling vehicle so that pulling force from the pulling vehicle is directed along the longitudinal axis of the puller and which has two pipe connecting holes defined therethrough adjacent to the other end thereof.

2 Claims, 2 Drawing Sheets

PIPE PULLING METHOD AND DEVICE

TECHNICAL FIELD OF THE INVENTION

The present invention relates to the general art of pipes and conduits, and to the particular field of means and methods for pulling pipes.

BACKGROUND OF THE INVENTION

The installation of pipe in underground service is accomplished by various methods. These methods include digging a trench mechanically or manually digging using a shovel. After a trench is dug, the pipe is usually pulled underground by means of a chinese finger trap. A chinese finger trap is a hollow wire mesh tube which encircles and grips the outside of the pipe. One end of the chinese finger trap is then attached to a motive device or pulling vehicle. The attachment on the motive device or pulling vehicle usually includes a shank or ripper which precedes the chinese finger trap in the earth. A ripper opens a trench in the earth within which the chinese finger trap pulls the pipe. Once installation is completed the chinese finger trap is then removed from the end of the pipe.

Removal of the chinese finger trap from the pipe can be difficult since the pipe is usually in the trench covered with earth. The chinese finger trap must be forcibly compressed to cause it to loosen its grip on the pipe. This manual maneuver is difficult when the mesh is compacted with soil. Further, the end of the pipe may be damaged during pulling. Finally, the nature of the chinese finger trap requires the tool to be under tension to perform as desired. The chinese finger trap cannot be used to "back" pipe into tight areas where the motive device cannot be operated.

The inventor is aware of a system in which a pipe is pulled by a plow or a tractor. Typically, a powered vehicle such as a tractor pulls a subsoil plow through the soil. Attached to the back of the plow and following in the path of the opening formed by the plow is a pipe puller that holds the end of the pipe. As the plow moves through the soil it pulls the pipe puller and the pipe into the opening formed by the plow.

One of the problems with pulling plastic pipe as opposed to pulling metal pipes is that the plastic pipe generally has an inherent resiliency that may cause the pipe puller to slip off the plastic pipe. Also the interior and exterior of plastic pipes tend to be smoother and more difficult to grasp than certain metal pipes. Another difficulty with plastic pipes is that they are usually relatively soft and may contain plasticizers that make the surface of the pipe difficult to firmly grasp. In addition some of the pipe pullers are difficult to "set" or quickly attach the pipe puller to the plastic pipe. The present invention eliminates the problem of slippage and also permits the user to quickly engage or disengage the pipe puller from the plastic pipe.

There remains a need for a pipe pulling method and device which allows the puller to be quickly and non-destructively detached from the pipe after pulling; protects the end of the pipe during the underground pulling operation; and allows the pipe to be pulled without damaging the pipe.

Furthermore, with regard to underground watering systems, it is desirable to have some means and method to pull at one time a plurality of pipes as through a slit trench in installing a watering system with said plurality of pipes, which are generally of a relatively small diameter, running to a common supply source. Plastic pipes are commonly used for such purpose and care must be exercised in the use of a pipe pulling device in connection with plastic pipes to avoid deforming or rupturing such pipes.

Therefore, there is a need for a pipe pulling device and method that can pull more than one pipe at once and which can safely pull more than one plastic pipe.

SUMMARY OF THE INVENTION

These, and other, objects are achieved by a pipe puller which is rectangular in shape and is connected at one end thereof to a pulling vehicle, perhaps with a plow thereinbetween, so that pulling force from the pulling vehicle is directed along the longitudinal axis of the puller. The puller and which has two pipe connecting holes defined therethrough adjacent to the other end thereof and which are oriented with respect to each other and with respect to the attachment of the puller to a pulling vehicle in a manner such that the pulling force is applied to a pipe attached to the puller adjacent to the connecting holes.

The pipe puller is made of durable material and will allow a user to pull more than one pipe at a time thereby making the work efficient. Furthermore, the pipe or pipes will be bent or kinked back upon itself or their selves as it or they pass through the puller so dirt or the like is prevented from entering the pipe or pipes during the pulling process.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWING FIGURES

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE INVENTION

Figure 1:
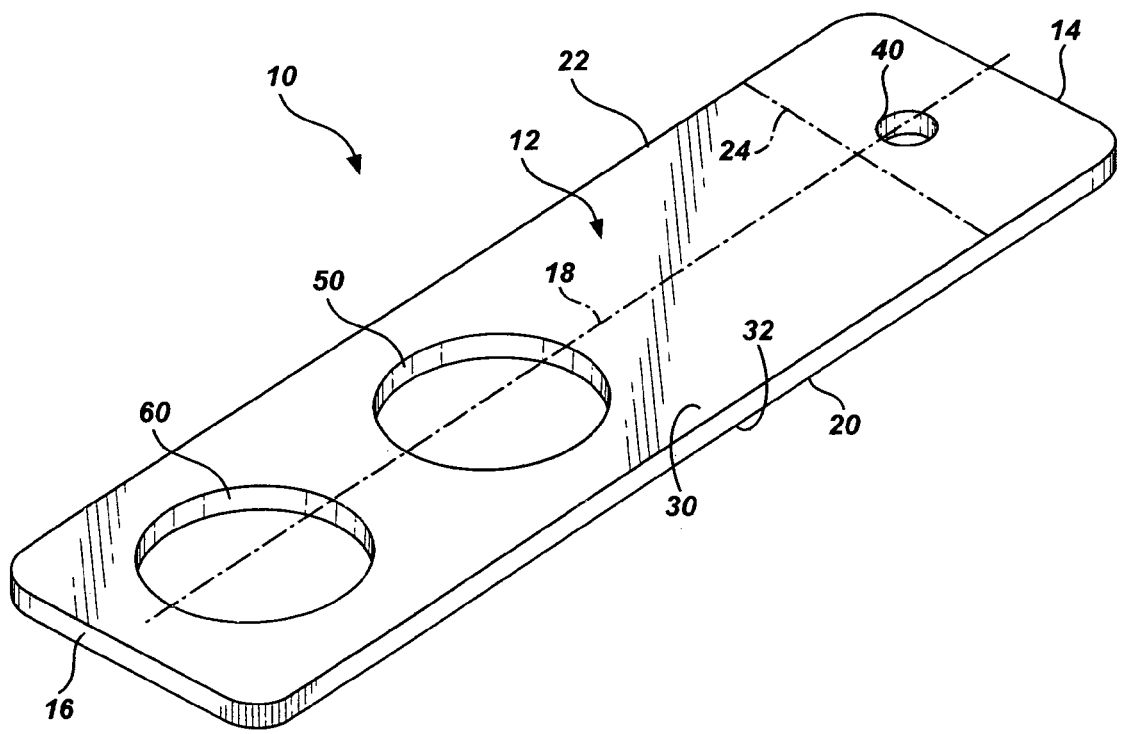
FIG. 1 is a perspective view of a pipe puller embodying the principles of the present invention.

Referring to the figures, it can be understood that the device of the present invention is embodied in a pipe puller 10 which includes a body member 12 which can be made of durable materials, such as steel or the like, and which is rectangular in shape to have a first end 14, a second end 16 and a longitudinal major axis 18 extending therebetween. Body member 12 of pipe puller 10 further includes a first side 20, a second side 22 and a transverse axis 24 extending between the two sides as well as a first surface 30 and a second surface 32.

A flexible connector attaching hole 40 is defined through the puller adjacent to first end 14 on the longitudinal axis 18, and two pipe-attaching holes 50 and 60 are defined through the puller adjacent to second end 16. The two pipe-attaching holes and the connector attaching hole are all located and centered on the longitudinal major axis and are located adjacent to each other. Thus, due to the location of the holes, pulling force from a pulling vehicle applied to the pipe puller is directed along the longitudinal axis of the pipe puller and applied to pipes attached to the pipe puller at the pipe-attaching holes linearly to be uniform and efficient.

Figure 2:
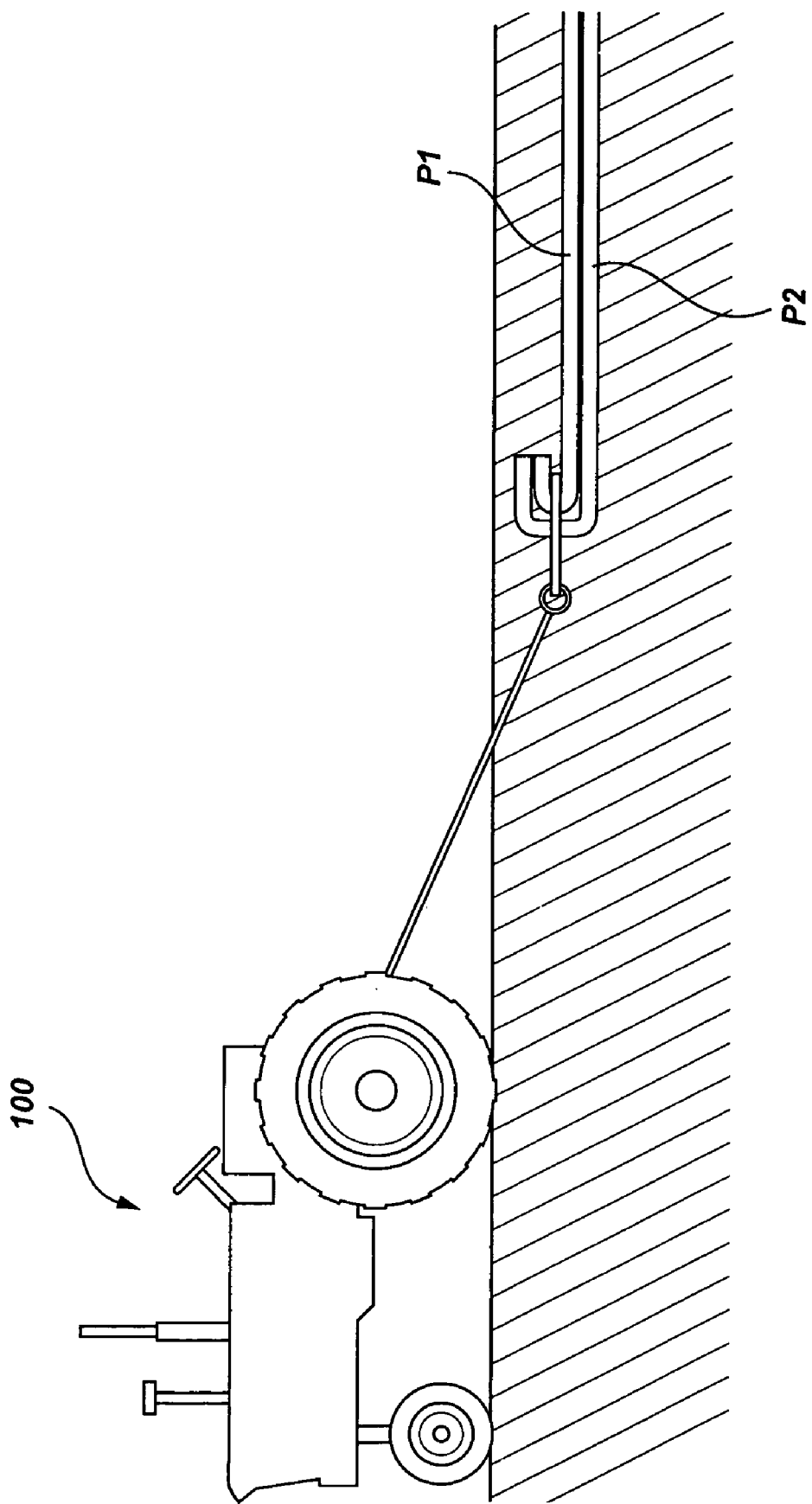
FIG. 2 shows the pipe puller attached to a pulling vehicle pulling two plastic pipes.

As shown in FIG. 2, pipes P1 and P2 are attached to the pipe puller adjacent to holes 50 and 60 respectively and the pipe puller is attached to a pulling vehicle 100, such as a tractor or the like by a flexible connector, such as a suitable cable C or the like which is attached to the pulling vehicle at one end thereof and to the pipe puller at the other end to the pipe puller adjacent to attaching hole 40.

As can be understood from FIG. 2, after the pipe puller is attached to the pulling vehicle and the pipes are attached to the pipe puller, the pipes can be pulled through the ground or below ground level as necessary.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A method of pulling at least one soft pipe below ground level which comprises:

A unitary body member which includes a first hole perpendicular to the major axis of the body member located near a peripheral edge of the body member, and a second hole spaced apart from the first hole; and a third hole spaced apart and adjacent to the second hole;

the holes being oriented with respect to each other so that centers of the holes are all aligned with each other perpendicular to and along the major axis of the body member so that pulling force applied to the body member adjacent to the first hole is transferred by the body to the second and third holes in a linear manner; and a flexible connector passing through the first hole, attached at one end to the body member and at the other to a pulling vehicle; and at least one soft plastic pipe being inserted through the second or third hole, and bent back upon itself;

the body member being attached to, and pulled by the pulling vehicle connected to the first hole and at least one pipe being attached to the body member adjacent to the second and third holes when being pulled; and pulling the body member and pipes below ground level.

2. The pipe pulling method of claim 1 wherein the body member is formed of steel.

* * * * *